United States Patent
Wondrasek et al.

(10) Patent No.: US 11,773,750 B2
(45) Date of Patent: Oct. 3, 2023

(54) TURBOMACHINE COMPONENT RETENTION

(71) Applicant: General Electric Company, Schenectady, NY (US)

(72) Inventors: Michael Anthony Wondrasek, Greenville, SC (US); Sunil Rajagopal, Bangalore (IN); Derek Paul Columbus, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/738,390

(22) Filed: May 6, 2022

(65) Prior Publication Data
US 2023/0212960 A1  Jul. 6, 2023

(30) Foreign Application Priority Data

Jan. 5, 2022  (IN) .............................. 202211000616

(51) Int. Cl.
*F01D 5/32* (2006.01)
*F01D 25/24* (2006.01)

(52) U.S. Cl.
CPC ........ *F01D 25/246* (2013.01); *F05D 2240/11* (2013.01); *F05D 2260/38* (2013.01)

(58) Field of Classification Search
CPC . F01D 5/32; F01D 5/323; F01D 5/326; F01D 5/30; F01D 5/3007; F01D 5/3015; F01D 5/303; F01D 5/3038; F05D 2260/38
See application file for complete search history.

(56) References Cited

U.S. PATENT DOCUMENTS

| | | | |
|---|---|---|---|
| 3,955,898 A * | 5/1976 | Zaehring | F01D 5/3038 416/215 |
| 4,725,200 A | 2/1988 | Welhoelter | |
| 5,236,309 A | 8/1993 | Van Heusden et al. | |
| 6,102,664 A * | 8/2000 | Nguyen | F01D 5/26 416/500 |
| 8,616,850 B2 | 12/2013 | Ward et al. | |
| 9,945,243 B2 | 4/2018 | O'Leary | |
| 2002/0182081 A1 * | 12/2002 | Bachofner | F01D 5/32 416/220 R |
| 2014/0069101 A1 | 3/2014 | Race et al. | |
| 2015/0101351 A1 | 4/2015 | Healy et al. | |

FOREIGN PATENT DOCUMENTS

EP  3009614 A1  4/2016

\* cited by examiner

*Primary Examiner* — David E Sosnowski
*Assistant Examiner* — Maxime M Adjagbe
(74) *Attorney, Agent, or Firm* — Dority & Manning, P.A.

(57) ABSTRACT

Turbomachine components and compressors are provided. The turbomachine component includes a platform and a mounting portion that extends from the platform. The mounting portion includes a dovetail received by a slot defined in the turbomachine. The slot includes a floor and a ceiling. The dovetail includes an inner surface and an outer surface. A hole is defined in the dovetail from an inlet at the inner surface to an end wall. The hole has a cylindrical portion and a tapered portion. A mechanical spring is disposed within the hole and in contact with the floor and the end wall such that the outer surface of the dovetail is forced into contact with the ceiling of the slot.

18 Claims, 5 Drawing Sheets

FIG. 7

TURBOMACHINE COMPONENT RETENTION

CROSS-REFERENCE TO RELATED APPLICATIONS

This application claims the benefit of priority to Indian Patent Application No. 202211000616, filed on Jan. 5, 2022, the disclosure of which is incorporated by reference herein in its entirety.

TECHNICAL FIELD

The present disclosure relates generally to the improved retention of a turbomachine component. Particularly, the present disclosure relates to a compressor component having mounting features that improve retention without causing wear.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid (e.g., air) entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Typical turbomachines include both rotating components (such as rotor blades) coupled to the rotor shaft and non-rotating components (such as stator vanes or nozzles) coupled to the casing. Both the rotating components and the non-rotating components are typically removable and therefore include a suitable mounting portion that is configured to engage a complementary attachment slot in the perimeter of the rotor disk (for rotating components) or the casing (for non-rotating components).

However, issues exist with the use of many known turbomachine components mounted in the manner described above. For example, operational vibrations of the turbomachine can cause damage to the mounting portion over time. In the case of rotating components, the slot into which the mounting portion of the rotating component is inserted may be slightly larger than the mounting portion, which facilitates installation and allows for thermal expansion of the rotating component. Accordingly, the mounting portions are designed such that movement of a full speed turbomachine keeps the rotating components loaded into the slots. However, many turbomachines are operated at partial rotational speed, which can result in an incomplete loading of the rotating components in the slots due to decreased force. Operation in this way can increase the wear and/or damage to the mounting portions of the rotating components, thereby resulting in unwanted repair shut-downs and increased maintenance costs.

Accordingly, an improved turbomachine component (e.g., rotating or non-rotating) is desired and would be appreciated in the art. Particularly, an improved turbomachine component that allows for operation of the turbomachine at partial rotational speed without causing damage to the turbomachine component over time is desired in the art.

BRIEF DESCRIPTION

Aspects and advantages of the turbomachine components and compressors in accordance with the present disclosure will be set forth in part in the following description, or may be obvious from the description, or may be learned through practice of the technology.

In accordance with one embodiment, a turbomachine component is provided. The turbomachine component includes a platform and a mounting portion that extends from the platform. The mounting portion includes a dovetail received by a slot defined in the turbomachine. The slot includes a floor and a ceiling. The dovetail includes an inner surface and an outer surface. A hole is defined in the dovetail from an inlet at the inner surface to an end wall. The hole has a cylindrical portion and a tapered portion. A mechanical spring is disposed within the hole and in contact with the floor and the end wall such that the outer surface of the dovetail is forced into contact with the ceiling of the slot.

In accordance with another embodiment, a compressor of a turbomachine is provided. The compressor includes one or more rotor disks defining a shaft and a casing surrounding the shaft. A slot is defined in one of the one or more rotor disks or the casing. The compressor further includes a compressor component received by the slot. The compressor component includes a platform and a mounting portion that extends from the platform. The mounting portion includes a dovetail received by a slot defined in the one or more rotor disks or the casing. The slot includes a floor and a ceiling. The dovetail includes an inner surface and an outer surface. A hole is defined in the dovetail from an inlet at the inner surface to an end wall. The hole has a cylindrical portion and a tapered portion. A mechanical spring is disposed within the hole and in contact with the floor and the end wall such that the outer surface of the dovetail is forced into contact with the ceiling of the slot.

These and other features, aspects and advantages of the present turbomachine components and compressors will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present turbomachine components and compressors, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present turbomachine components and compressors, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of flowing between the areas specified.

As used herein, the terms "upstream" (or "forward") and "downstream" (or "aft") refer to the relative direction of fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. The terms "directly coupled," "directly fixed," "directly attached to," and the like indicate that no intervening components or features are present. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive or and not to an exclusive or. For example, a condition designated "A or B" is satisfied by any one of the following: A is true or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
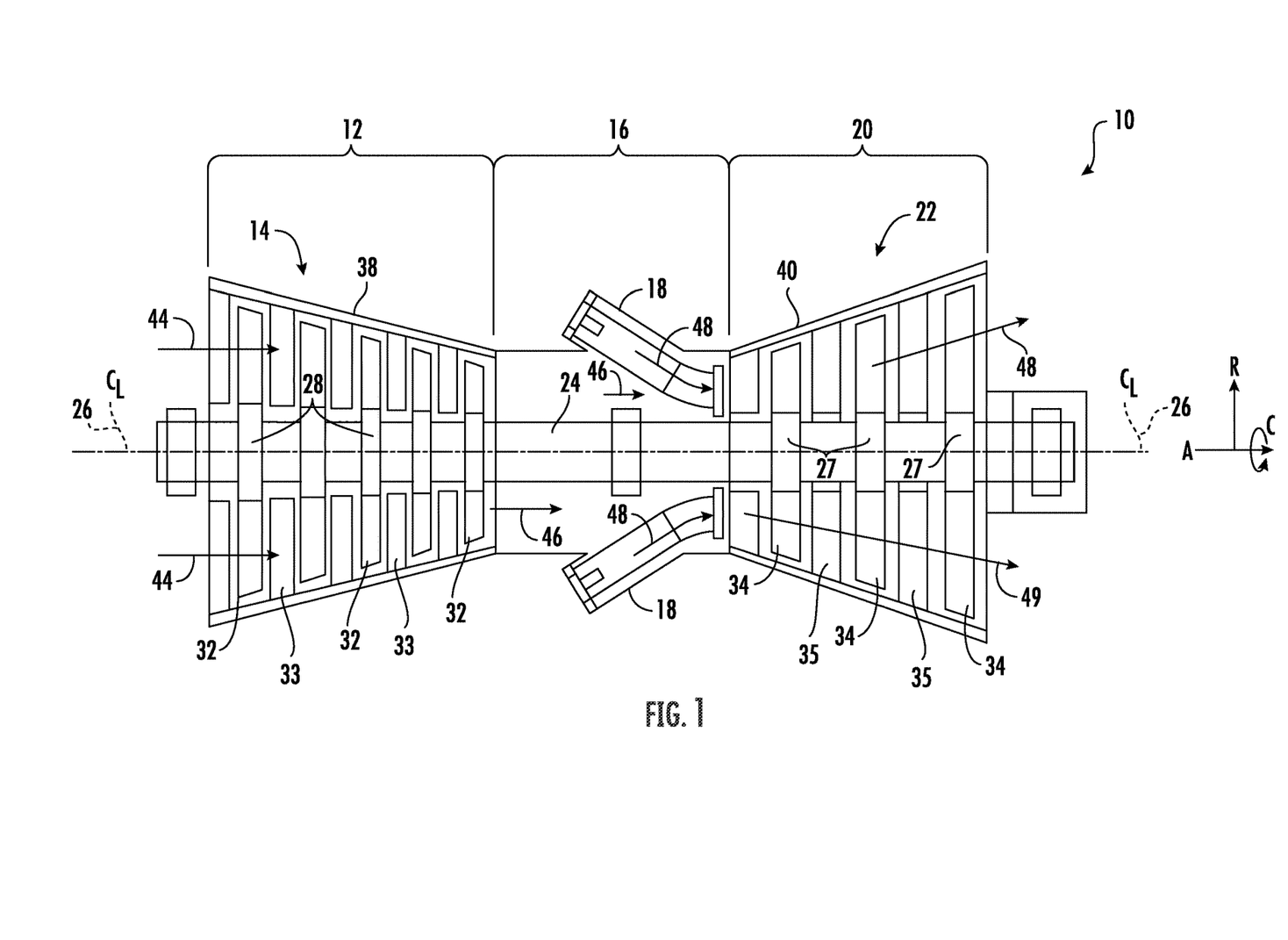
FIG. 1 is a schematic illustration of a turbomachine in accordance with embodiments of the present disclosure.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the invention as described herein may be used in any type of turbomachine including but not limited to a steam turbine, an aircraft gas turbine, or a marine gas turbine.

As shown, the gas turbine 10 generally includes a compressor section 12 including a compressor 14 disposed at an upstream end of the gas turbine 10, a combustion section 16 having at least one combustor 18 downstream from the compressor 14, and a turbine section 20 including a turbine 22 that is downstream from the combustion section 16. A shaft 24 extends along an axial centerline 26 of the gas turbine 10 at least partially through the compressor 14 and/or the turbine 22. In particular configurations, the shaft 24 may comprise of a plurality of individual shafts coupled to one another.

The compressor section 12 may generally include a plurality of rotor disks 28 and a plurality of rotor blades 32 extending radially outwardly from and connected to each rotor disk 28. Each rotor disk 28 in turn may be coupled to or form a portion of the shaft 24 that extends through the compressor section 12. The compressor section 12 further includes a compressor casing 38 that circumferentially surrounds the portion of the shaft 24 and the rotor blades 32. Stator vanes 33 may be mounted to the compressor casing 38. The rotor blades 32 and the stator vanes 33 may be arranged in an alternating manner, such that the stator vanes 33 are disposed between rotor blades 32.

The turbine section 20 may generally include a plurality of rotor disks 27 and a plurality of rotor blades 34 extending radially outwardly from and being interconnected to each rotor disk 27. Each rotor disk 27 in turn may be coupled to or form a portion of the shaft 24 that extends through the turbine section 20. The turbine section 20 further includes a turbine casing 40 that circumferentially surrounds the portion of the shaft 24 and the rotor blades 34, thereby at least partially defining a hot gas path 49 through the turbine section 20. Stationary turbine nozzles 35 may be mounted to the turbine casing 40. The rotor blades 34 and stationary turbine nozzles 35 may be arranged in an alternating manner, such that the stationary turbine nozzles 35 are disposed between rotor blades 34.

In operation, a working fluid 44 such as air is routed into the compressor 14 where it is progressively compressed in part by the rotor blades 32 as it is routed towards the combustion section 16. A compressed working fluid 46 flows from the compressor 14 and is supplied to the combustion section 16. The compressed working fluid 46 is distributed to the combustors 18 where it is mixed with a fuel (not shown) to provide a combustible mixture. The combustible mixture is burned to produce combustion gases 48 at a relatively high temperature and high velocity. The combustion gases 48 are routed through the turbine 22 where thermal and kinetic energy is transferred to the rotor blades 34, thereby causing the shaft 24 to rotate. The mechanical rotational energy may be used to power the compressor section 12 and/or to generate electricity. For example, in particular applications, the shaft 24 is coupled to a generator (not shown) to produce electricity. The combustion gases 48 exiting the turbine section 20 may then be exhausted from the gas turbine 10 via an exhaust section.

The compressor 14 and the turbine 22 may each includes rotating components (such as the rotor blades 32, the rotor blades 34, or others) and non-rotating or stationary components (such as the stator vanes 33, the stationary turbine nozzles 35, or others). The rotating components may be coupled to the rotor disks 28, 27, such that the rotating components rotate with the shaft 24. The non-rotating components may be coupled to the casing (e.g., the compressor casing 38 or the turbine casing 40) such that the non-rotating components are stationary during operation of the gas turbine 10. Both the rotating components and the non-rotating components may include mounting portions configured to engage a complementary circumferential slot defined in the perimeter of the rotor disk 28, 27 (for rotating components) or casing 38, 40 (for non-rotating components). The mounting portions may include a dovetail, hook, or other lateral protrusions received by the corresponding circumferential slot. For example, the circumferential slot may be defined in the casing 38, 40 for non-rotating components or the rotor disks 28, 27 for rotating components.

As used herein, the term "turbomachine component" is any rotating component (e.g., rotor blades, fairings, spacers, or others) or non-rotating component (e.g., stator vanes or stationary nozzles) of the compressor 14 or turbine 22, which has a mounting portion received by a corresponding circumferential slot defined in the rotor disk 28, 27 (for rotating components) or the casing 38, 40 (for non-rotating components). However, in particularly advantageous embodiments, the turbomachine component may be a rotating component of the compressor 14.

The gas turbine 10 may define a cylindrical coordinate system having an axial direction A extending along the axial centerline 26, a radial direction R perpendicular to the axial centerline 26, and a circumferential direction C extending around the axial centerline 26. A directional legend is provided for convenience in FIGS. 1, 2, and 4.

Figure 2:
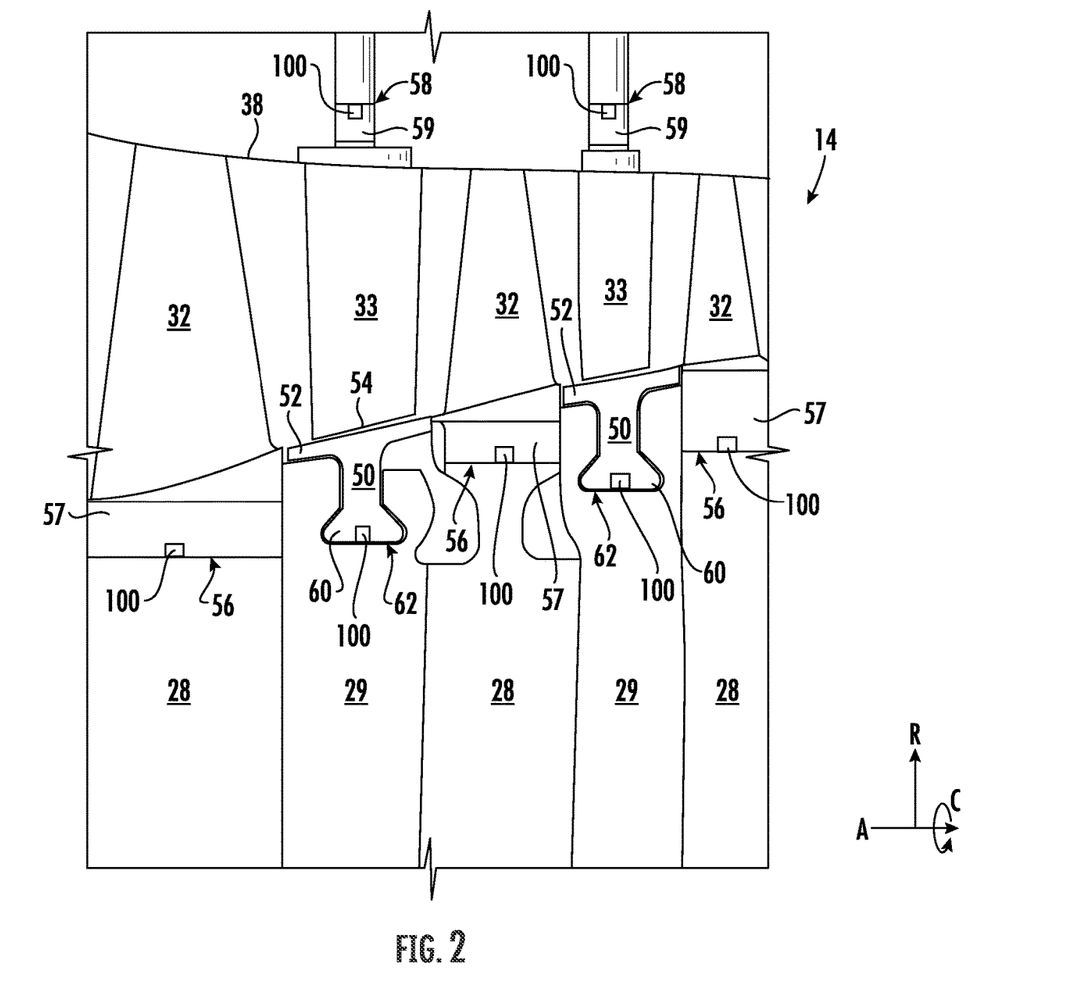
FIG. 2 illustrates an enlarged cross-sectional planar view of a portion of a compressor in accordance with embodiments of the present disclosure.

FIG. 2 provides an enlarged cross-sectional planar view of a portion of the compressor 14. As shown, the compressor casing 38 generally surrounds the compressor 14 to contain a working fluid (e.g., air). Alternating stages of rotor blades 32 and stator vanes 33 arranged within the casing 38 progressively impart kinetic energy to the working fluid to produce a compressed working fluid at a highly energized state. Each rotor blade 32 may be circumferentially arranged around (and coupled to) the rotor disk 28 and may extend radially outward toward the casing 38. Conversely, each stator vane 33 may be circumferentially arranged around (and coupled to) the casing 38 and may extend radially inward toward a spacer disk 29 that separates adjacent stages of rotor blades 32.

In many embodiments, the rotor blades 32 may each include a mounting portion 57, which is formed to connect and/or to secure the rotor blade 32 to the rotor disk 28. For example, the mounting portion 57 may include a T-shaped structure, a dovetail, a hook, one or more lateral protrusions, or any combination thereof. The mounting portion 57 may be configured to mount into the rotor disk 28 in the axial direction A, the radial direction R, and/or a circumferential direction C. For example, the rotor disk 28 may define a slot or opening 56 that generally corresponds with the shape of the mounting portion 57. The slot 56 may be an axial slot or opening, a radial slot or opening, and/or a circumferential slot or opening. In exemplary embodiments, the slot 56 may be defined annularly (e.g., 360° in the circumferential direction) around the entire perimeter of the rotor disk 28.

Similarly, the stator vanes 33 may each include a mounting portion 59, which is formed to connect and/or to secure the stator vane 33 to the casing 38. For example, the mounting portion 59 may include a T-shaped structure, a dovetail, a hook, one or more lateral protrusions, or any combination thereof. The mounting portion 59 may be configured to mount into the casing 38 in the axial direction A, the radial direction R, and/or a circumferential direction C. For example, the casing 38 may define a slot or opening 58 that generally corresponds with the shape of the mounting portion 59. The slot 58 may be an axial slot or opening, a radial slot or opening, and/or a circumferential slot or opening. In exemplary embodiments, the slot 58 may be defined annularly (e.g., 360° in the circumferential direction) around the entire perimeter of the casing 38.

As shown in FIG. 2, the compressor 14 may further include fairings 50 circumferentially arranged around (and coupled to) the spacer disk 29. For example, the fairings 50 may extend radially outward from the spacer disk 29 to a platform 52. The platform 52 provides a boundary for the compressed working fluid traveling through the compressor 14. Additionally, the platform 52 generally conforms to an inner tip 54 of the stator vanes 33 to reduce leakage between the stator vanes 33 and the spacer disks 29. In many embodiments, as shown in FIGS. 3 and 4, the fairings 50 may be generally T-shaped segments.

In exemplary embodiments, the fairings 50 may each include a mounting portion 60, which is formed to connect and/or to secure the fairing 50 to the spacer disk 29. For example, the mounting portion 60 may include a T-shaped structure, a dovetail, a hook, one or more lateral protrusions, or any combination thereof. The mounting portion 60 may be configured to mount into the spacer disk 29 in the axial direction A, the radial direction R, and/or a circumferential direction C. For example, the spacer disk 29 may define a slot or opening 62 that generally corresponds with the shape of the mounting portion 60. The slot 62 may be an axial slot or opening, a radial slot or opening, and/or a circumferential slot or opening. In exemplary embodiments, the slot 62 may be defined annularly (e.g., 360° in the circumferential direction) around the entire perimeter of the spacer disk 29.

As shown in FIG. 2, the mounting portions 57, 59, 60 of the various compressor components may each include a mechanical spring 100 housed within a corresponding hole, void, or opening defined by the mounting portion 57, 59, 60. The mechanical spring 100 may be at least partially compressed in order to load the mounting portion 57, 59, 60 against the corresponding slot 56, 58, 62. As should be appreciated, the mechanical spring 100 may advantageously keep the compressor component loaded within the slot at any operational speed of the turbomachine (e.g., partial speed), thereby reducing wear and misalignments to the compressor component. As used herein, "compressor component" may refer to one of the rotor blade 32, the stator vane 33, and/or the fairing 50. However, in exemplary embodiments, "compressor component" may refer to the fairing 50.

Figure 3:
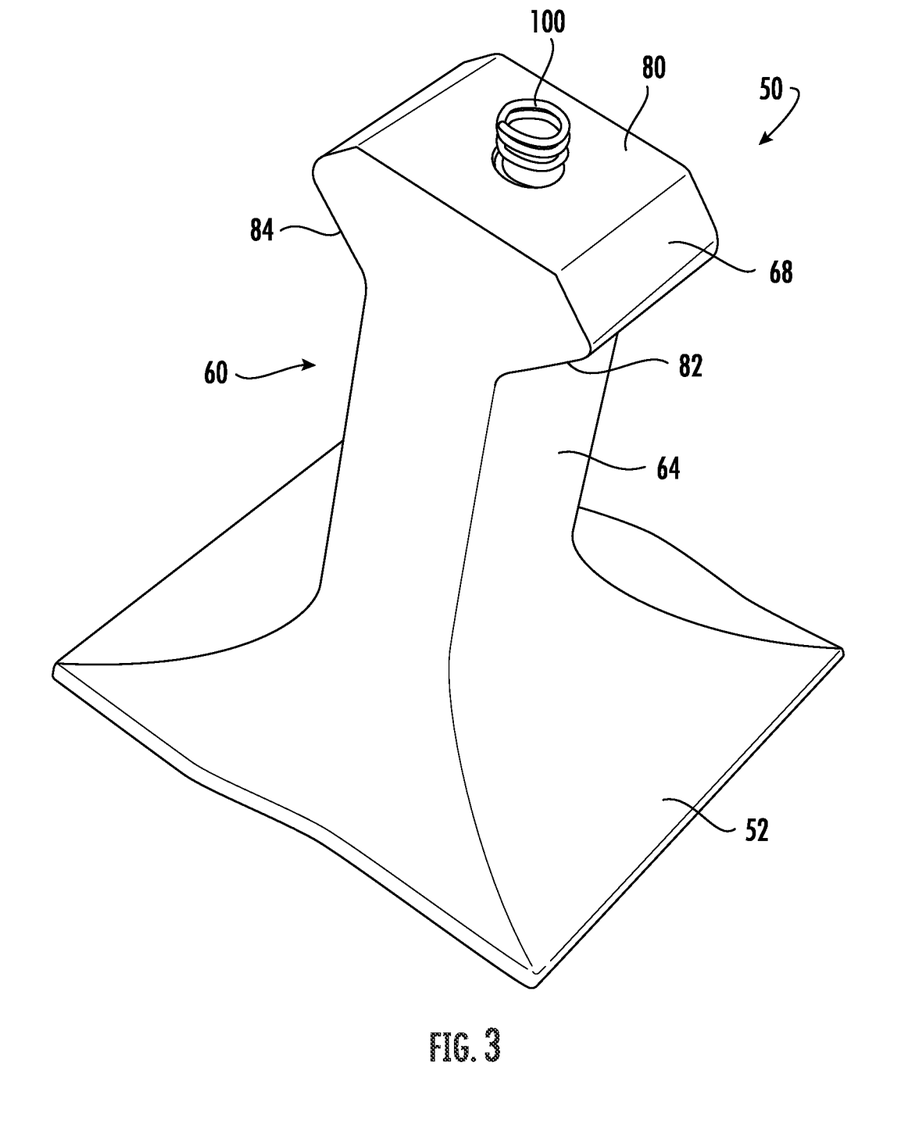
FIG. 3 illustrates a perspective view of a compressor component in accordance with embodiments of the present disclosure.
Figure 4:
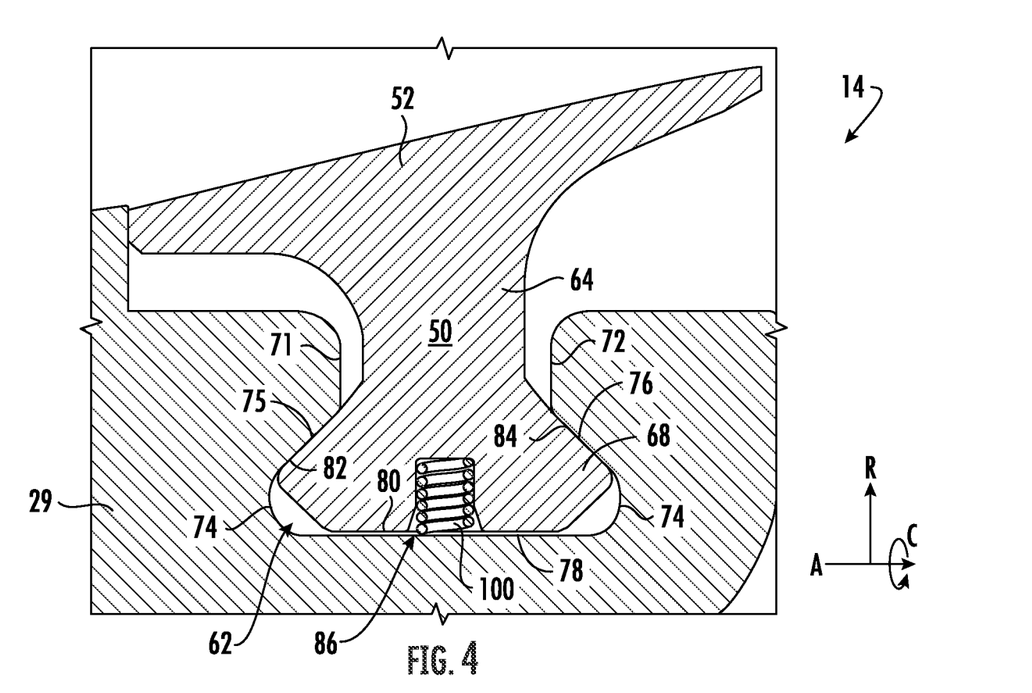
FIG. 4 illustrates an enlarged cross-sectional planar view of a compressor having a compressor component mounted therein in accordance with embodiments of the present disclosure.

FIG. 3 illustrates a perspective view of a turbomachine component, in accordance with embodiments of the present disclosure. Particularly, FIG. 3 illustrates a perspective view of a fairing 50, and FIG. 4 illustrates an enlarged cross-sectional view of a compressor 14 having a fairing 50 coupled to a spacer disk 29. As shown in FIGS. 3 and 4, the fairing 50 may be generally T-shaped. As should be appreciated, the fairing 50 may not include an airfoil (as opposed to a rotor blade or stator vane). Instead, the fairing 50 includes a platform 52 spaced apart from, and contoured to correspond with, an inner tip 54 of the stator vane 33 (as shown in FIG. 2). The platform 52 may be the longest portion of the fairing 50 with respect to the axial direction A. In many embodiments, the fairing 50 may further include a mounting portion 60 having a neck 64 and a dovetail 68. The neck 64 may extend radially between the platform 52 and the dovetail 68. As shown, the neck 64 may be the shortest portion of the fairing 50 with respect to the axial direction A (e.g., shorter axially than the platform 52 and the dovetail 68). In various embodiments, the dovetail 68 may extend radially inward from, and axially outward from, the neck 64. In particular embodiments, as shown, the dovetail 68 may be generally shaped as a diamond or hexagon.

The spacer disk 29 may define a slot 62 that receives the mounting portion 60 of the fairing 50. In particular, the slot 62 may extend radially inward into the spacer disk 29 and may extend continuously in the circumferential direction C (i.e., annularly) around the perimeter of the spacer disk 29. The slot 62 may be generally sized and shaped to correspond with the mounting portion 60.

In particular embodiments, as shown in FIG. 4, the slot 62 may be defined collectively by side walls 71, 72, ceilings 75, 76, curved edges 74, and a floor 78. The side walls 71, 72 may be axially spaced apart from one another and may each extend generally radially (i.e., the side walls 71, 72 are generally parallel to each other). The side walls 71, 72 may include a first side wall 71 and a second side wall 72. For example, the ceilings 75, 76 may include a first ceiling 75 that extends from the first side wall 71 and a second ceiling 76 that extends from the second side wall 72. The ceilings 75, 76 may each extend generally linearly between the curved edges 74 and the respective side wall 71, 72. The ceilings 75, 76 may each be generally oblique to both the axial direction A and the radial direction R. The floor 78 may extend generally axially between the curved edges 74. The floor 78 may be the radially innermost portion or boundary of the slot 62. As should be appreciated, the boundaries of the slot 62 may not include any sharp edges or angle changes, which advantageously reduces stress concentrations or risers that could otherwise result during loading of the fairing 50 onto the boundaries of the slot 62. As used herein, "loading" may be the forced contact between two components.

In many embodiments, the dovetail 68 may include an inner surface 80, a first outer surface 82, and a second outer surface 84. The inner surface 80 may be radially spaced apart from the outer surfaces 82, 84. In particular, the inner surface 80 may be the radially innermost surface of the dovetail 68 (and the radially innermost surface of the fairing 50), and the outer surfaces 82, 84 may be the radially outermost surfaces of the dovetail 68. The inner surface 80 may be generally contoured to correspond with the floor 78, such that the inner surface 80 may be generally parallel to the floor 78 with a minimal gap between the floor 78 and the inner surface 80 when the mechanical spring 100 is loaded within the fairing 50. The first outer surface 82 may be contoured to correspond with the first ceiling 75 (e.g., generally parallel to the first ceiling), such that the first outer surface 82 may make flush or continuous contact with the first ceiling 75 when loaded. Similarly, the second outer surface 84 may be contoured to correspond with the second ceiling 76 (e.g., generally parallel to the first ceiling), such that the second outer surface 84 may make flush or continuous contact with the second ceiling 76 when loaded.

Figure 5:
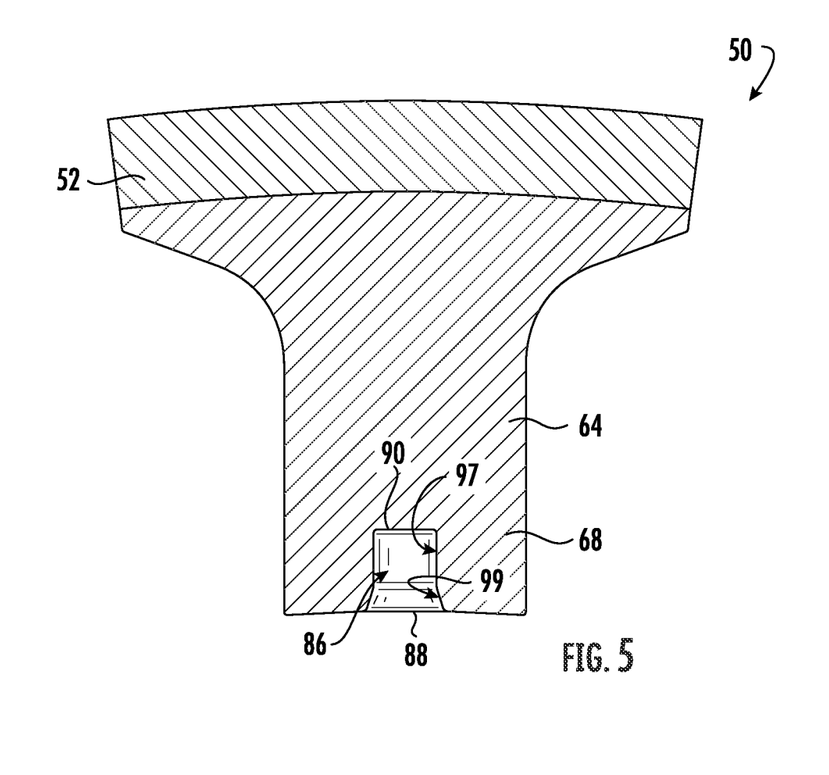
FIG. 5 illustrates a cross-sectional view of a fairing from along the axial direction in accordance with embodiments of the present disclosure.

FIG. 5 illustrates a cross-sectional view of the fairing 50 from along the axial direction (e.g., forward looking aft), in accordance with embodiments of the present disclosure. As shown, the inner surface 80 may be generally arcuate, curved, or rounded. For example, the inner surface 80 may extend generally along the circumferential direction C. However, as shown in FIG. 4, the inner surface 80 may be generally linear in the axial direction A.

Additionally, the dovetail 68 may further define a hole 86 extending generally radially into the dovetail 68. For example, the hole 86 from an inlet 88 at the inner surface 80 to an end wall 90. The end wall 90 may be disposed radially outward of the curved edges 74 of the slot 62. In exemplary embodiments, a mechanical spring 100 may be disposed within the hole 86 (i.e., disposed within the dovetail 68 because the dovetail 68 defines the hole 86). For example, the mechanical spring 100 may be entirely housed (or encapsulated) between the boundaries of the hole 86 and the inner surface 80.

Figure 6:
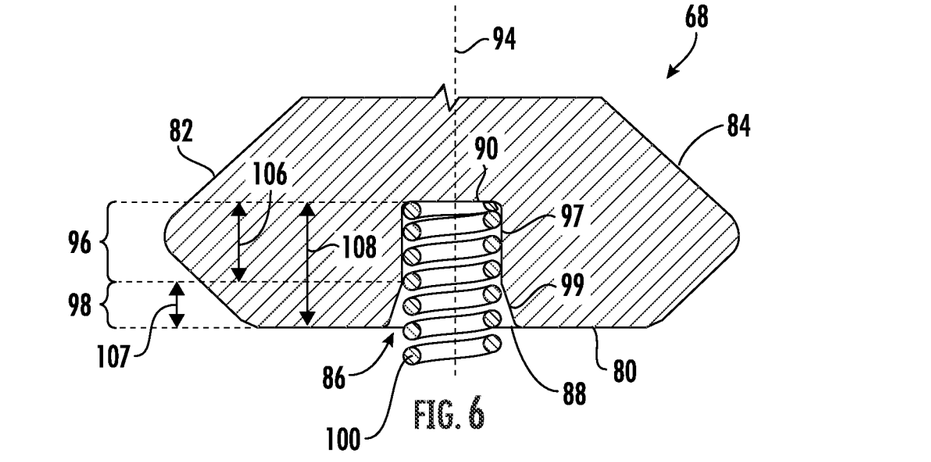
FIG. 6 illustrates a cross-sectional view of a dovetail in accordance with embodiments of the present disclosure.
Figure 7:
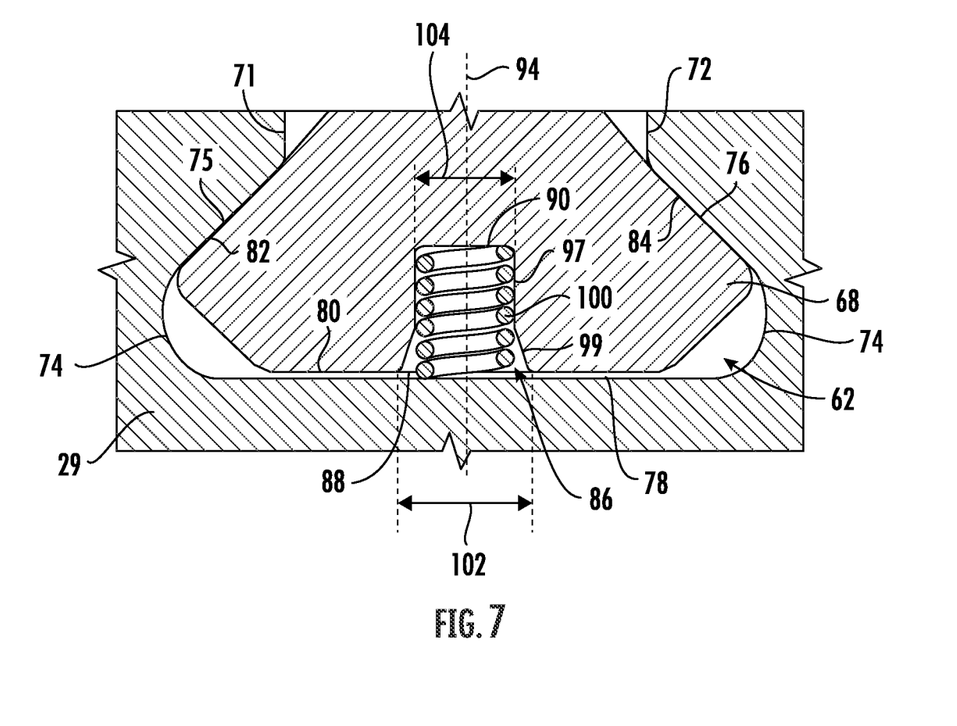
FIG. 7 illustrates a cross-sectional view of a dovetail disposed within a slot in accordance with embodiments of the present disclosure.

FIG. 6 illustrates a cross-sectional view of a dovetail 68 isolated from the slot 62 of the spacer disk, and FIG. 7 illustrates a cross-sectional view of the dovetail 68 disposed within the slot 62, in accordance with embodiments of the present disclosure. In FIG. 6, the mechanical spring 100 may be uncompressed, and in FIG. 7, the mechanical spring 100 may be at least partially compressed. For example, the mechanical spring 100 may be oriented generally radially and may be at least partially compressed between the floor 78 of the slot 62 and the end wall 90 of the hole 86, such that the outer surface(s) 82, 84 of the dovetail 68 are forced into contact with the ceiling(s) 75, 76 of the slot 62. For example, the mechanical spring 100 may exert equal and opposite forces along the radial direction R. Particularly, the mechanical spring 100 may exert a first downward force against the floor 78 and a second upward force against the end wall 90, which in turn forces the outer surface(s) 82, 84 into contact with the ceiling(s) 75, 76.

In exemplary embodiments, the hole 86 may be defined along an axial centerline 94 of the dovetail 68, such that the inlet 88 is centered on the inner surface 80. In particular, the dovetail 68, the hole 86, and the mechanical spring 100 may each share a common axial centerline (e.g., the axial centerline 94). In other words, the dovetail 68, the hole 86, and the mechanical spring 100 may be coaxial, which advantageously equally distributes the forces exerted by the mechanical spring 100 and which keeps the component (e.g., fairing 50) loaded within the slot (e.g., slot 62).

In certain embodiments, as shown, the end wall 90 may be planar. For example, the end wall 90 may be entirely flat, non-curved, and/or non-contoured. In other words, the end wall 90 may be generally parallel to the axial direction A, generally parallel to the floor 78, and generally parallel to the inner surface 80. As should be appreciated, the end wall 90 being planar may advantageously allow the mechanical spring 100 to be fully seated against the end wall 90, thereby equally distributing the forces. Additionally, the end wall 90 being planar may be particularly advantageous over, e.g., a conical end wall or curved end wall, because it prevents misalignments of the mechanical spring 100 and equally distributes the spring forces.

In various embodiments, the hole 86 may include cylindrical portion 96 and a tapered portion 98. For example, the cylindrical portion 96 may be defined by a first boundary surface 97 of the dovetail 68, and the tapered portion 98 may be defined by a second boundary surface 99 of the dovetail 68. In many embodiments, the tapered portion 98 may extend from the inlet 88 to the cylindrical portion 96, and the cylindrical portion 96 may extend from the tapered portion 98 to the end wall 90. More particularly, the tapered portion 98 may converge in diameter (or taper in diameter) along the axial centerline 94 (i.e., radially) from the inlet 88 to the cylindrical portion 96, and the cylindrical portion 96 may have a constant diameter and extend from the tapered portion 98 to the end wall 90.

In particular embodiments, the inlet 88 defines a first diameter 102, and the cylindrical portion 96 defines a second diameter 104 (which is constant or uniform for the cylindrical portion 96). The first diameter 102 may be larger than the second diameter 104. In some embodiments, the first diameter 102 may be between about 110% and about 140% of the second diameter 104. In other embodiments, the first diameter 102 may be between about 115% and about 135% of the second diameter 104. In particular embodiments, the first diameter 102 may be between about 120% and about 130% of the second diameter 104.

In various embodiments, the hole 86 may define a total height 108 from the inlet 88 (i.e., the inner surface 80) to the end wall 90. Additionally, the cylindrical portion 96 may define a first height 106, and the tapered portion 98 may define a second height 107 (such that a sum of the first height 106 and the second height 107 is equal to the total height 108). The first height 106, the second height 107, and the total height 108 may each be measured along the axial centerline 94 (i.e., radially). In some embodiments, the first height 106 may be between about 40% and about 80% of the total height 108. In other embodiments, the first height 106 may be between about 45% and about 75% of the total height 108. In particular embodiments, the first height 106 may be between about 50% and about 70% of the total height 108.

In exemplary embodiments, the tapered portion 98 may be frustoconical (i.e., the shape of a frustum of a cone). For example, the tapered portion 98 may linearly converge (or taper) in diameter from the first diameter 102 at the inlet 88 to the second diameter 104 at the cylindrical portion 96, such that second boundary surface 99 is straight in an axial-radial plane and generally oblique to the axial direction A and the radial direction R in the axial-radial plane.

As shown, the first boundary surface 97 of the dovetail 68 at least partially defines the cylindrical portion 96 of the hole 86. The mechanical spring 100 may be in contact with the first boundary surface 97, thereby ensuring the mechanical spring 100 maintains alignment within the hole 86. The second boundary surface 99 of the dovetail 68 at least partially defines the tapered portion 98 of the hole 86. The mechanical spring 100 may be spaced apart (e.g., radially spaced apart) from the second boundary surface 99. In this way, the mechanical spring 100 may not contact the tapered portion 98 (or may have very limited contact with the tapered portion 98), thereby increasing hardware life of both the mechanical spring 100 and the dovetail 68 by minimizing frictional contact (i.e., wear) during operation.

In exemplary embodiments, the mechanical spring 100 may be a helical spring (or coil spring). In various embodiments, the mechanical spring 100 may be any one of a helical spring, a leaf spring, a wave spring, a disk spring, a spiral spring, or other spring. The helical spring may be a constant rate helical spring (e.g., constant spring force through compression of spring) or a progressive rate helical spring (e.g., the spring force increases while the spring is compressed).

As should be appreciated, the increased diameter of the tapered portion 98 may advantageously prolong the life of the mechanical spring 100 and the dovetail 68 by reducing the amount of contact experienced between the mechanical spring 100 and the boundaries of the hole 86 during operation of the gas turbine 10. For example, the fairing 50 may experience movements or vibrations during operation of the turbomachine, which can shift the mechanical spring 100 relative to the dovetail 68 and the slot 62. As such, the cylindrical portion 96 ensures the mechanical spring 100 stays aligned within the hole 86, and the tapered portion 98 reduces the frictional contact (i.e., wear) experienced by the mechanical spring 100 and the dovetail 68, thereby prolonging the hardware life of both the mechanical spring 100 and the dovetail 68. Accordingly, the hole 86 having both a cylindrical portion 96 and a tapered portion 98 is particularly advantageous because it increases component life while maintaining alignment.

This written description uses examples to disclose the invention, including the best mode and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A turbomachine component comprising: a platform; a mounting portion extending from the platform, the mounting portion including a dovetail received by a slot defined in the turbomachine, the slot including a floor and a ceiling, the dovetail comprising: an inner surface and an outer surface; and a hole defined in the dovetail from an inlet at the inner surface to an end wall, the hole having a cylindrical portion and a tapered portion, wherein a mechanical spring is disposed within the hole and in contact with the floor and the end wall such that the outer surface of the dovetail is forced into contact with the ceiling of the slot.

The turbomachine component as in one or more of these clauses, wherein the tapered portion extends from the inlet to the cylindrical portion, and wherein the cylindrical portion extends from the tapered portion to the end wall.

The turbomachine component as in one or more of these clauses, wherein the inlet defines a first diameter, wherein the cylindrical portion defines a second diameter, and wherein the first diameter is larger than the second diameter.

The turbomachine component as in one or more of these clauses, wherein the first diameter is between about 110% and about 140% of the second diameter.

The turbomachine component as in one or more of these clauses, wherein the hole defines a total height from the inlet to the end wall, wherein the cylindrical portion defines a first height, and wherein the first height is between about 40% and about 80% of the total height.

The turbomachine component as in one or more of these clauses, wherein the mechanical spring is a helical spring.

The turbomachine component as in one or more of these clauses, wherein the end wall is planar.

The turbomachine component as in one or more of these clauses, wherein the tapered portion is frustoconical.

The turbomachine component as in one or more of these clauses, wherein a first boundary surface of the dovetail at least partially defines the cylindrical portion of the hole, the mechanical spring being disposed in contact with the first boundary surface.

The turbomachine component as in one or more of these clauses, wherein a second boundary surface of the dovetail at least partially defines the tapered portion of the hole, the mechanical spring being spaced apart from the second boundary surface.

A compressor of a turbomachine, comprising: one or more rotor disks defining a shaft; a casing surrounding the shaft; a slot defined in one of the one or more rotor disks or the casing; and a compressor component received by the slot, the compressor component comprising: a platform; and a mounting portion extending from the platform, the mounting portion including a dovetail received by the slot, the slot including a floor and a ceiling, the dovetail comprising: an inner surface and an outer surface; and a hole defined in the dovetail from an inlet at the inner surface to an end wall, the hole having a cylindrical portion and a tapered portion, wherein a mechanical spring is disposed within the hole and in contact with the floor and the end wall such that the outer surface of the dovetail is forced into contact with the ceiling of the slot.

The compressor as in one or more of these clauses, wherein the tapered portion extends from the inlet to the cylindrical portion, and wherein the cylindrical portion extends from the tapered portion to the end wall.

The compressor as in one or more of these clauses, wherein the inlet defines a first diameter, wherein the cylindrical portion defines a second diameter, and wherein the first diameter is larger than the second diameter.

The compressor as in one or more of these clauses, wherein the first diameter is between about 110% and about 140% of the second diameter.

The compressor as in one or more of these clauses, wherein the hole defines a total height from the inlet to the end wall, wherein the cylindrical portion defines a first height, and wherein the first height is between about 40% and about 80% of the total height.

The compressor as in one or more of these clauses, wherein the mechanical spring is a helical spring.

The compressor as in one or more of these clauses, wherein the end wall is planar.

The compressor as in one or more of these clauses, wherein the tapered portion is frustoconical.

The compressor as in one or more of these clauses, wherein a first boundary surface of the dovetail at least partially defines the cylindrical portion of the hole, the mechanical spring being disposed in contact with the first boundary surface.

The compressor as in one or more of these clauses, wherein a second boundary surface of the dovetail at least partially defines the tapered portion of the hole, the mechanical spring being spaced apart from the second boundary surface.

What is claimed is:

1. A turbomachine component comprising:
   a platform;
   a mounting portion extending from the platform, the mounting portion including a dovetail received by a slot defined in the turbomachine, the slot including a floor and a ceiling, the dovetail comprising:
   an inner surface and an outer surface; and
   a hole defined in the dovetail from an inlet at the inner surface to an end wall, the hole having a cylindrical portion and a tapered portion, wherein a mechanical spring is disposed within the hole and in contact with the floor and the end wall such that the outer surface of the dovetail is forced into contact with the ceiling of the slot, wherein the hole defines a total height from the inlet to the end wall, wherein the cylindrical portion defines a first height and the tapered portion defines a second height, wherein the first height is between about 40% and about 80% of the total height, and wherein the second height is a remainder of the total height.

2. The turbomachine component as in claim 1, wherein the tapered portion extends from the inlet to the cylindrical portion, and wherein the cylindrical portion extends from the tapered portion to the end wall.

3. The turbomachine component as in claim 1, wherein the inlet defines a first diameter, wherein the cylindrical portion defines a second diameter, and wherein the first diameter is larger than the second diameter.

4. The turbomachine component as in claim 3, wherein the first diameter is between about 110% and about 140% of the second diameter.

5. The turbomachine component as in claim 1, wherein the mechanical spring is a helical spring.

6. The turbomachine component as in claim 1, wherein the end wall is planar.

7. The turbomachine component as in claim 1, wherein the tapered portion is frustoconical.

8. The turbomachine component as in claim 1, wherein a first boundary surface of the dovetail at least partially defines the cylindrical portion of the hole, the mechanical spring being disposed in contact with the first boundary surface.

9. The turbomachine component as in claim 1, wherein a second boundary surface of the dovetail at least partially defines the tapered portion of the hole, the mechanical spring being spaced apart from the second boundary surface.

10. A compressor of a turbomachine, comprising:
    one or more rotor disks defining a shaft;
    a casing surrounding the shaft;

a slot defined in one of the casing or the one or more rotor disks; and a compressor component received by the slot, the compressor component comprising:

a platform; and a mounting portion extending from the platform, the mounting portion including a dovetail received by the slot, the slot including a floor and a ceiling, the dovetail comprising:

an inner surface and an outer surface; and a hole defined in the dovetail from an inlet at the inner surface to an end wall, the hole having a cylindrical portion and a tapered portion, wherein a mechanical spring is disposed within the hole and in contact with the floor and the end wall such that the outer surface of the dovetail is forced into contact with the ceiling of the slot, wherein the hole defines a total height from the inlet to the end wall, wherein the cylindrical portion defines a first height and the tapered portion defines a second height, wherein the first height is between about 40% and about 80% of the total height, and wherein the second height is a remainder of the total height.

11. The compressor as in claim 10, wherein the tapered portion extends from the inlet to the cylindrical portion, and wherein the cylindrical portion extends from the tapered portion to the end wall.

12. The compressor as in claim 10, wherein the inlet defines a first diameter, wherein the cylindrical portion defines a second diameter, and wherein the first diameter is larger than the second diameter.

13. The compressor as in claim 12, wherein the first diameter is between about 110% and about 140% of the second diameter.

14. The compressor as in claim 10, wherein the mechanical spring is a helical spring.

15. The compressor as in claim 10, wherein the end wall is planar.

16. The compressor as in claim 10, wherein the tapered portion is frustoconical.

17. The compressor as in claim 10, wherein a first boundary surface of the dovetail at least partially defines the cylindrical portion of the hole, the mechanical spring being disposed in contact with the first boundary surface.

18. The compressor as in claim 10, wherein a second boundary surface of the dovetail at least partially defines the tapered portion of the hole, the mechanical spring being spaced apart from the second boundary surface.

* * * * *